United States Patent [19]
Nishimura

[11] Patent Number: 5,133,007
[45] Date of Patent: Jul. 21, 1992

[54] SIDE TONE CORRECTION CIRCUIT

[75] Inventor: Shinichi Nishimura, Isehara, Japan

[73] Assignee: Ricoh Company, Ltd., Tokyo, Japan

[21] Appl. No.: 543,432

[22] Filed: Jun. 26, 1990

[30] Foreign Application Priority Data

Oct. 26, 1989 [JP] Japan .................. 1-280978

[51] Int. Cl.$^5$ .................................. H04M 1/00
[52] U.S. Cl. ........................ 379/405; 379/398; 379/402; 379/391; 379/392
[58] Field of Search ............... 379/398, 399, 400, 401, 379/402, 403, 404, 405, 391, 392

[56] References Cited

U.S. PATENT DOCUMENTS

| 4,096,361 | 6/1978 | Crawford | 379/403 |
|---|---|---|---|
| 4,096,362 | 6/1978 | Crawford | 379/403 |
| 4,278,848 | 7/1981 | Rizzo et al. | 379/403 |
| 4,368,361 | 1/1983 | Chung et al. | 379/404 |
| 4,380,690 | 4/1983 | Matsufuji et al. | 379/402 |
| 4,498,018 | 2/1985 | Lofmark | 379/402 |
| 4,807,283 | 2/1989 | Pyhalammi | 379/403 |
| 5,034,978 | 7/1991 | Nguyen et al. | 379/403 |
| 5,054,062 | 10/1991 | Molner | 379/402 |

Primary Examiner—James L. Dwyer
Assistant Examiner—Jhancy Augustus
Attorney, Agent, or Firm—Oblon, Spivak, McClelland, Maier & Neustadt

[57] ABSTRACT

A conversion circuit for connecting a two-wire circuit and a four-wire circuit to each other comprises a transformer having a primary side and a secondary side, the primary side being connected to a two-wire circuit having a variable impedance, a first amplifying circuit having a first input terminal connected to the secondary side of the transformer for receiving an audio frequency signal from the two-wire circuit and a second input terminal, the first amplifying circuit having an output terminal connected to a reception-side line of a four-wire circuit, a second amplifying circuit having an input terminal connected to a transmission-side line of the four-wire circuit and an output terminal connected to the secondary side of the transformer for sending out an audio signal on the transmission-side line to the two-wire circuit, a plurality of impedance matching circuits having respective impedances each determined so as to simulate one state of the variable impedance of the two-wire circuit, and a switch for selectively connecting one of the plurality of impedance matching circuits to the second input terminal of the first amplifying circuit.

5 Claims, 8 Drawing Sheets

SIDE TONE CORRECTION CIRCUIT

BACKGROUND OF THE INVENTION

The present invention generally relates to side tone correction circuits and more particularly to a side tone correction circuit for correcting the side tone characteristic of the two-wire/four-wire conversion circuit used in a facsimile apparatus which is combined with a telephone unit.

In the communication circuits for exchanging information via a telephone network, audio frequency signals are sent to and received from a transmission line or telephone line of the network via a transformer. In such a communication circuit, it is essential that an impedance matching be established between the circuit and the network in order to obtain a satisfactory communication performance.

In the case of a facsimile apparatus and the like which is equipped with a telephone unit, there is usually provided a tranformer for connection to the telephone line, and a two-wire/four-wire conversion circuit is connected to the secondary side of the transformer for amplifying and sending out the transmission signal to the telephone line and further for amplifying the received signal and supplying the same to the hand set of the telephone unit. In such a two-wire/four-wire conversion circuit, there occurs rather frequently a problem of "side tone" wherein the transmission signal to be transmitted is fed back and mixed to the reception side system as a side tone. This problem occurs particularly when the impedance matching between the telephone network and the conversion circuit is not properly established. As the condition of impedance matching changes depending on the distance between the telephone exchange station and the site where the individual facsimile apparatus is used, the level of the side tone decreases when the facsimile apparatus is connected to a distant station referred to hereinafter as "distant end" and the level of the side tone increases when the facsimile apparatus is connected to a near station referred to hereinafter as "near end". In order to compensate for these variations of side tone level, various side tone compensation circuits have been proposed so far.

For example, the Japanese Laid-open Patent Application No. 59-95758 describes a side tone correction circuit for a telephone unit, wherein there is established a condition to cancel out the side tone with respect to the distant end and an increase of the side tone level beyond the allowable level is prevented by adjusting the sound volume of the reception signal on the basis of detection of the current flowing through the network such that the sound volume level when there is a connection to the distant end has a level substantially identical to the sound volume level when there is a connection to the near end. Further, there is also a known circuit wherein a switching circuit having a hysteresis characteristic is used. In this circuit, the switching circuit is controlled in response to the detected line current. Thereby, an automatic and stable level adjusting of the received signal is achieved.

Although the foregoing prior art side tone correction circuits are effective in suppressing the side tone by adjusting the sound volume of the received audio signal, such a prior art circuit cannot provide compensation for the sound quality. Because of this, there arises a problem such that the quality of the received audio signal is deteriorated.

More specifically, the transformer has its own frequency characteristic which changes in response to the change of impedance of the telephone network connected to its primary side. Thus, although the level of the side tone can be suppressed by the adjustment of the amplification of the transmitted and received audio signals, there still remains a problem of deterioration of the sound quality of the received audio signal. Moreover, in the case of the telephone unit connected to the facsimile apparatus, the telephone unit is connected to the secondary side of the transformer and cannot detect the current in the line.

SUMMARY OF THE INVENTION

Accordingly, it is a general object of the present invention to provide a novel and useful side tone correction circuit wherein the problems aforementioned are eliminated.

Another object of the present invention is to provide a side tone correction circuit for eliminating the side tone from the reception side of a two-wire/four-wire conversion circuit by correcting the input impedance of the reception side amplification circuit of the two-wire/four-wire conversion circuit on the basis of the use of a plurality of balance circuits each having its own impedance which has a value analogous to the impedance of various telephone lines, so that the deterioration of the sound quality of the received audio signal caused by the mismatching of impedance is prevented. According to the present invention, the side tone can be successfully eliminated from the reception side system and thus the quality of the received audio signal can be improved.

Another object of the present invention is to provide a side tone correction circuit for improving the sound quality and at the same time optimizing the sound volume by eliminating the side tone from the reception side of the two-wire/four-wire conversion circuit while maintaining the sound volume constant, in which the input impedance and the amplification factor of an amplification circuit at the reception side of the two-wire/four-wire conversion circuit are automatically adjusted in response to the change of the impedance of the telephone line which in turn is detected on the basis of the current flowing through the telephone line. The adjustment of the input impedance and the amplification factor are achieved by a balance circuit as well as a plurality of amplification factor adjusting circuits. According to the present invention, the sound volume of the received audio signal can be held constant while improving the sound quality.

Still another object of the present invention is to provide a side tone correction circuit for optimizing the side tone level of the received audio signal at the reception side of the two-wire/four-wire conversion circuit in response to the change of the impedance of the telephone line, by adjusting the input impedance of the amplifier at the reception side of the two-wire/four-wire conversion circuit in response to the actually detected side tone level. For this purpose, the side tone correction circuit of the present invention uses a number of balance circuits each having an input impedance corresponding to various states of the telephone line, and controlled such that the side tone level is detected by changing the balance circuit. On the basis of the detection, one of the balance circuits which provides the minimum side tone level is selected.

Other objects and further features of the present invention will become apparent from the following detailed description when read in conjunction with the attached drawings.

DETAILED DESCRIPTION

Figure 1:
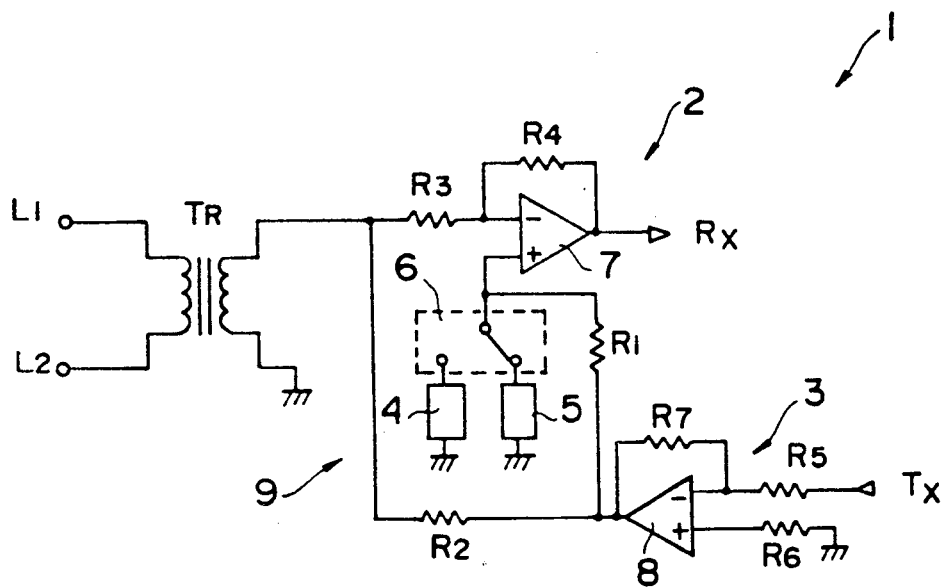
FIG. 1 is a circuit diagram showing an overall construction of the side tone correction circuit according to a first embodiment of the present invention.

Referring to FIG.1, a first embodiment of the present invention will now be described. The side tone correction circuit illustrated in FIG.1 is the circuit used in a facsimile apparatus combined with a telephone unit, and comprises a two-wire/four-wire conversion circuit 1 which in turn includes a reception side amplification circuit 2, a transmission side amplification circuit 3, balance circuits 4 and 5, a switch 6, and resistances R1 and R2. The conversion circuit 1 is connected to a secondary side of a transformer Tr which is connected to a two-wire telephone line L1, L2 at its primary side.

The reception side amplification circuit 2 includes an operational amplifier 7 and resistances R3 and R4, and outputs a received signal Rx, which is received from the line L1, L2, to the modem of the facsimile apparatus or to the hand set of the telephone apparatus not illustrated after amplification. The transmission side amplifier 3 includes an operational amplifier 8 and resistances R5-R7, and outputs a transmission signal Tx which is supplied from the modem or telephone unit, to the transformer TR after amplification. In the reception side amplification circuit 2, the operational amplifier 7 is used as the differential amplifier and the side tone is eliminated by subtracting the transmission signal component supplied thereto through the resistance R2 from the transmission signal component supplied via the resistance R1.

Figure 2:
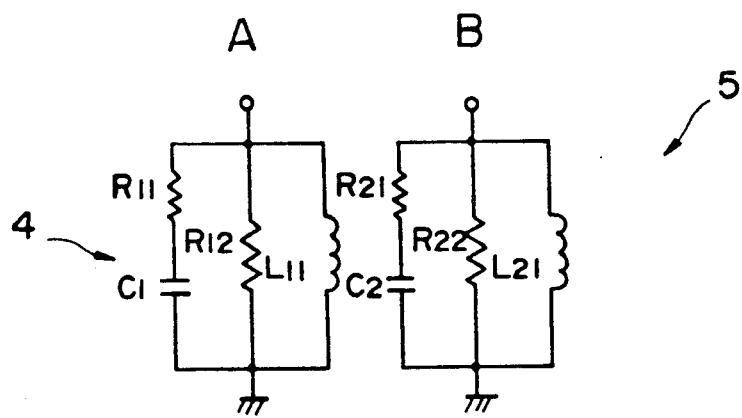
FIGS. 2A and 2B are circuit diagrams showing examples of the balance circuit used in the circuit of FIG.1.

The balance circuits 4 and 5 are formed by inductances L11, L21, capacitances C1, C2 and resistances R11, R12, R21 and R22 as illustrated in FIG.2, in which the balance circuit 4 has an impedance which simulates the impedance of the telephone line when the connection is made to the near end, while the balance circuit 5 has an impedance which simulates the impedance of the telephone line when the connection is made to the distant end. The switch 6 is activated from an operators port not illustrated or in response to the setting of a dip switch and the like, and selectively connects the balance circuits 4 and 5 to the reference input terminal (non-inverting input terminal) of the operational amplifier 7. A side tone correction circuit 9 is formed by the balance circuits 4 and 5 and the switch 6.

Next, the operation of the circuit of FIG.1 will be described. In brief, the side tone correction circuit of the present invention corrects or compensates for the side tone characteristic without deteriorating the sound quality of the audio signal outputted from the conversion circuit 1 by adjusting the input impedance of the reception side amplification circuit 2 by the balance circuit 4 and the balance circuit 5 both forming the side tone correction circuit 9.

Figure 3:
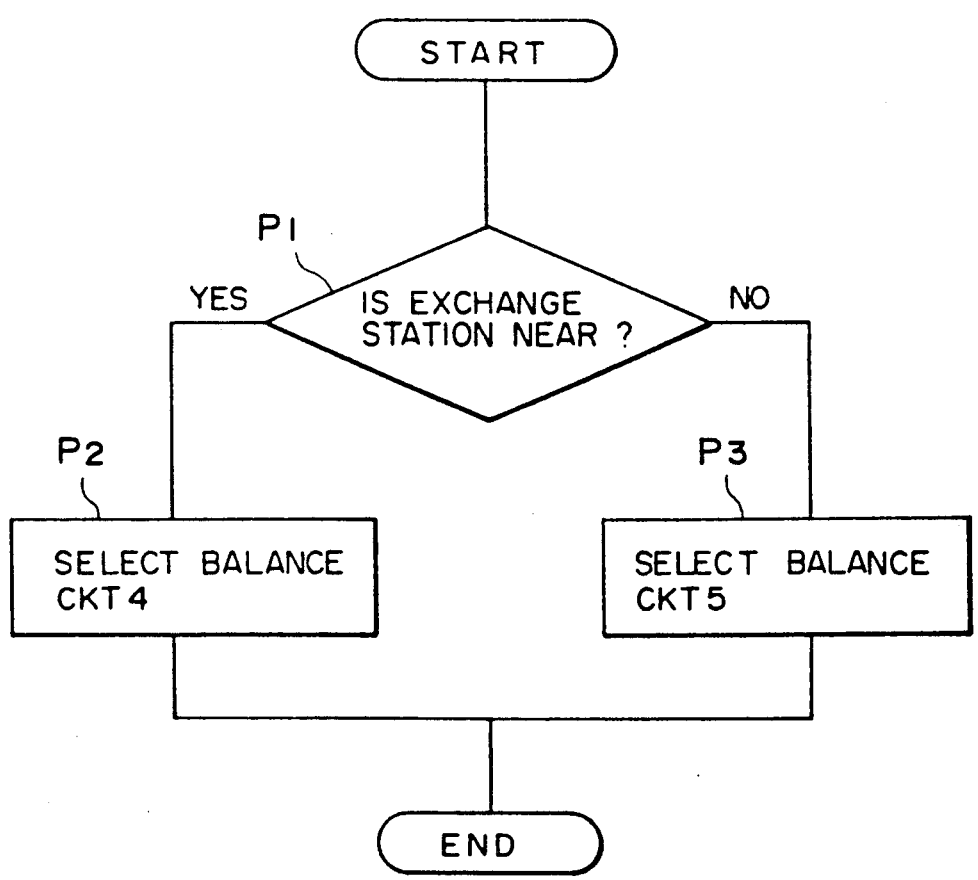
FIG.3 is a flowchart showing the control of the switching operation for switching the balance circuits in the circuit of FIG.1.

Next, the switching operation of the switch 6 will be described with reference to FIG.3 showing a flowchart.

When there is an incoming call to the telephone line L1, L2 and the operator has picked up the hand set not illustrated, the connection is established by a control system not illustrated. Next, the operator decides in a step P1 whether the terminal sending the call is near or far. If it is judged that the terminal is near on the ground that the sound volume is large, the operator switches the switch 6 manually to the side of the balance circuit 4 in a step P2, while when it is decided that the calling terminal is far, the operator selects the balance circuit 5 by actuating the switch 6. As a result, even when there is an impedance change in the telephone line L1, L2, the input impedance at the reference input terminal of the operational amplifier 7 is compensated for by the balance circuits 4 and 5 each having an impedance matching the line. Thereby, the input impedance at the signal input terminal or the inverting input terminal of the operational amplifier 7 forming the amplification circuit 2 becomes substantially identical to the input impedance at the reference input terminal or the non-inverting input terminal of the operational amplifier 7, and the level of the transmission signal incoming to the input terminal as well as the frequency characteristic becomes substantially identical to those at the reference terminal. As a result, the side tone is eliminated by a subtraction process for substantially the entire audible frequency range and the quality of the received audio signal is significantly improved.

Figure 4:
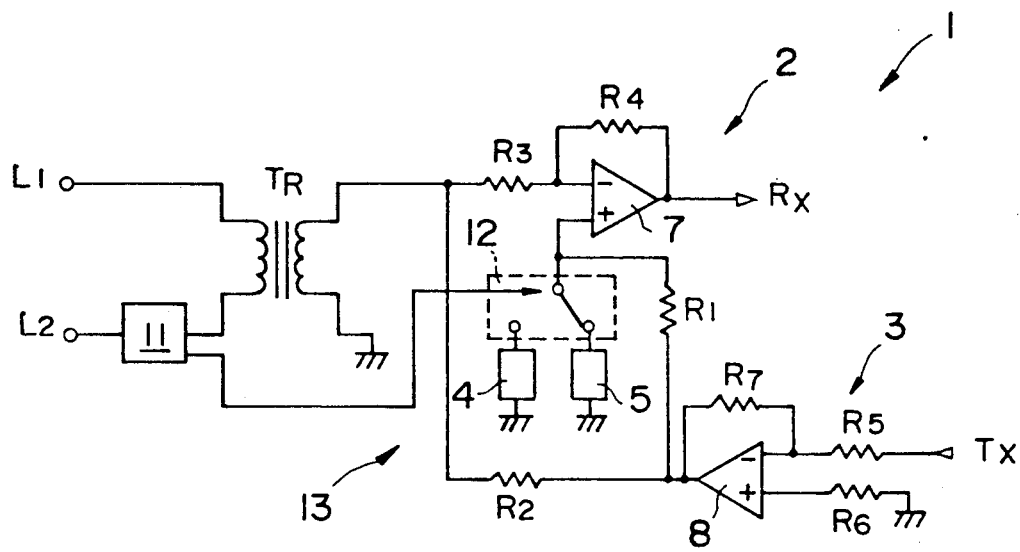
FIG.4 is a circuit diagram showing an overall construction of the side tone correction circuit according to a second embodiment of the present invention.

FIG.4 shows a second embodiment of the side tone correction circuit according to the present invention. In FIG.4, the parts which are identical to the parts described in the preceding drawings are given identical reference numerals and the description thereof will be omitted.

Referring to FIG.4, the two-wire/four-wire conversion circuit 1 further includes a current detector 11 comprising a photocoupler and resistances for detecting the current flowing through the telephone line L1, L2. The current detector 11 may be designed to produce a low level output when the current flowing through the telephone lines is equal to or larger than a predetermined level and a high level output when the current is less than the predetermined level. In this embodiment, the switch 6 is replaced by an analog switch 12 which is activated in response to the output of the current detector 11 and selectively connects one of the balance circuits 4 and 5 to the reference input of the operational amplifier 7. It should be noted that the balance circuits 4 and 5, the current detector 11, and the analog switch 12 form a second embodiment circuit 9 of the side tone correction circuit of the present invention.

Next, a description will be given of the operation of the side tone correction circuit 9.

Figure 5:
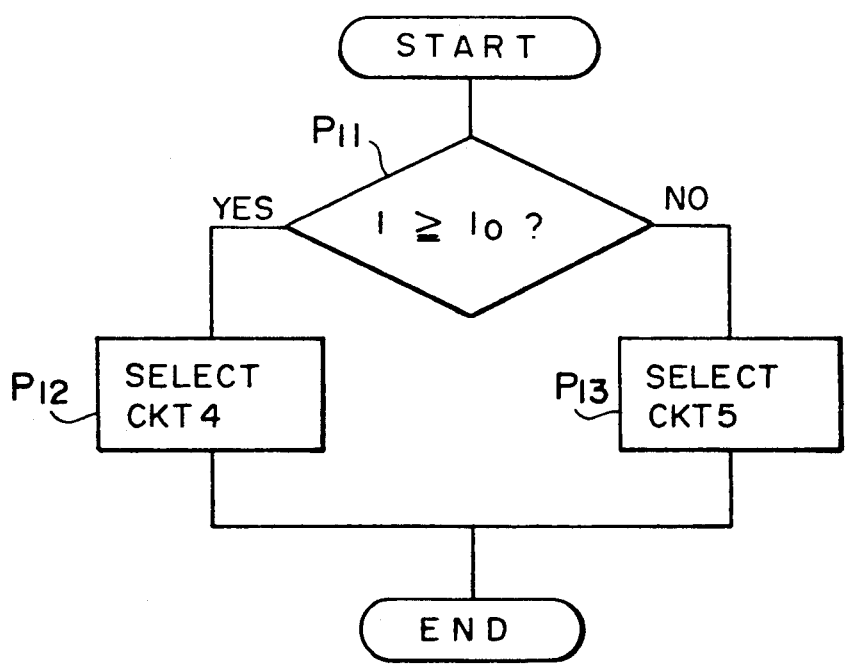
FIG.5 is a flowchart showing the control of the switching operation for switching the balance circuits in the side tone correction circuit of FIG.4.

In this embodiment, the input impedance of the reception side amplification circuit 2 is automatically corrected by the balance circuits 4 and 5 by activating the analog switch 12 in response to the output of the current detector 11. Hereinafter, the switching operation to the analog switch 12 will be described with reference to FIG.5 showing a flowchart.

When there is an incoming call to the telephone line L1, L2 and the operator has picked up the hand set, the connection is established by a not illustrated control system as usual. When the connection is established, the current detector 11 detects the current flowing through the line L1, L2 and discriminates if the value of the current is equal to or larger than the predetermined level or not as shown in FIG.5 in a step P11.

When the current is equal to or larger than the predetermined level in correspondence to the calling terminal located at the near end, the detector 11 produces a low level signal and activates the analog switch 12 in a step P12 such that the balance circuit 4 is connected to the reference terminal of the operational amplifier 7. On the other hand, when the current in the line L1, L2 is at the level exceeding the predetermined level, the detector 11 produces the high level signal and the analog switch 12 is activated in a step P13 in response thereto such that the balance circuit 5 is connected to the reference terminal of the operational amplifier 7. In the operation shown in FIG.5, a discrimination is made whether the calling terminal is at the near end or at the far end of the telephone network on the basis of the current flowing in the line L1, L2, and in response thereto the switching of the input impedance of the operational amplifier 7 and thus the amplification circuit 2 is made. Further, manual operation by the operator is eliminated in the present embodiment.

In the foregoing first and second embodiments, it is possible to change the amplification factor of the reception side amplification circuit 2 and the transmission side amplification circuit 3 in response to the switching operation of the switch 6 or analog switch 12. Thereby, a further reduction of the side tone level can be achieved.

The balance circuit is of course not limited to two circuits, as more than two circuits may be used. Obviously, a more exact impedance matching can be achieved by increasing the number of the balance circuits. Any type of balance circuit may be used as long as it provides the impedance similar to the impedance of the telephone line and as long as it provides a phase relation between the signals incoming to the inverting input terminal and non-inverting input terminal of the operational amplifier 7 such that the input signal to the non-inverting input terminal from the telephone line has a phase substantially identical to the phase of the input signal supplied to the non-inverting input terminal.

Figure 6:
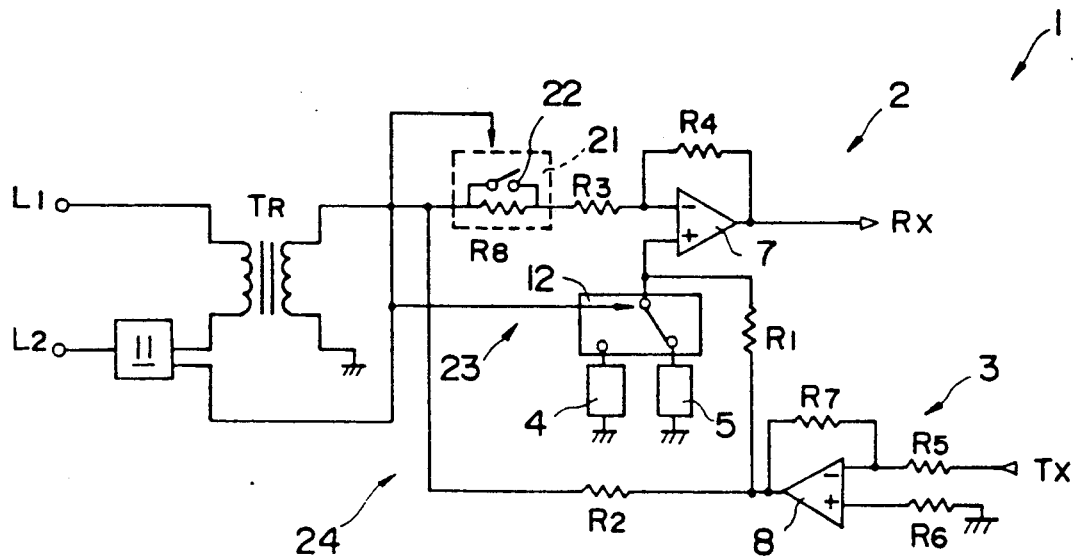
FIG.6 is a circuit diagram showing an overall construction of the side tone correction circuit according to a third embodiment of the present invention.

Next, a third embodiment of the present invention will be described with reference to FIGS.6 and 7. In the drawings, the parts already described with reference to the preceding drawings are given identical reference numerals and the description will be omitted.

The side tone correction circuit of the present embodiment includes an amplification factor adjusting circuit 21 comprising a switch 22 and a resistance R8 provided so as to adjust the amplification factor of the reception side amplification circuit 2. The switch 22 is turned on and turned off in response to the output of the current detector 11 such that it is opened when the output of the current detector 11 is low and closed when the output of the current detector 11 is high. The analog switch 12 and the switch 22 form a switching assembly 23 while the balance circuits 4, 5, current detector 11, analog switch 12 and the amplification factor adjusting circuit 21 form a side tone correction circuit 24.

Next, the operation of the circuit of FIG.6 will be described. In the circuit of the present embodiment, the amplification factor of the reception side amplification circuit 2 is adjusted by opening and closing the switch 22 in response to the output of the current detector 11. Thus, the sound volume of the received audio signal is changed simultaneously and automatically together with the input impedance of the reception side amplification circuit 2.

Figure 7:
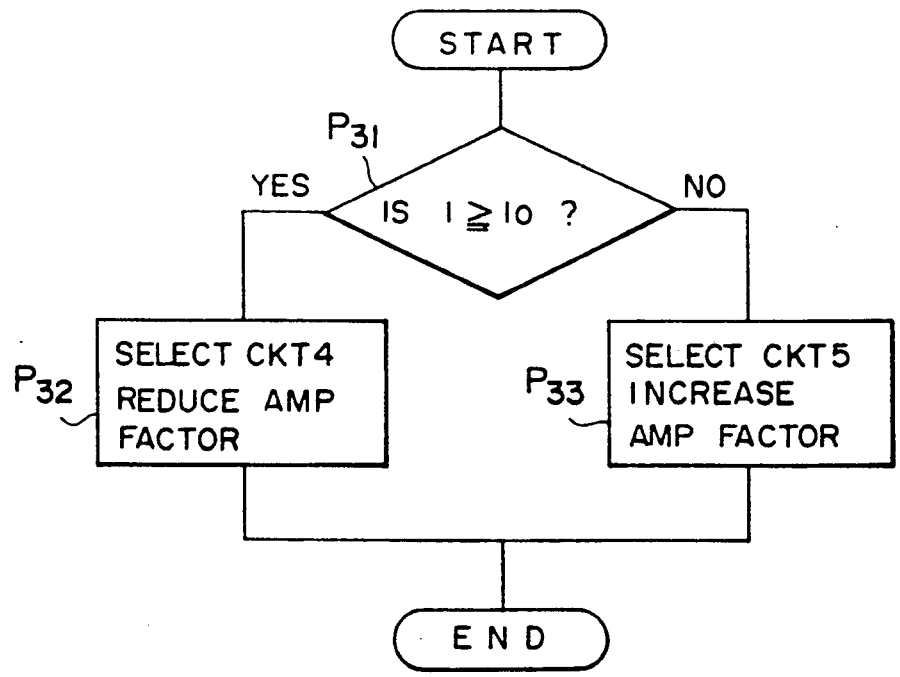
FIG.7 is a flowchart showing the control of the switching operation for switching the balance circuits in the side tone correction circuit of FIG.6.

FIG.7 shows a control operation flowchart of the analog switch 12 and the switch 22.

When there is an incoming call via the telephone line L1, L2 and the operator has picked up the hand set, the connection is established by a not illustrated controller in a way similar to the preceding embodiments. After the establishment of the connection, a discrimination is made in a step P21 whether the level of the detected current has a value equal to or larger than the predetermined current level or not. If it is confirmed that the current is equal to or larger than the foregoing predetermined current level, the analog switch 12 is activated in response to the low level signal from the detector 11 so as to connect the balance circuit 4 to the reference input terminal of the operational amplifier 7 in a step P22 and at the same time the switch 22 is closed. When the current in the telephone line L1, L2 is smaller than the predetermined level, on the other hand, the analog switch 12 is activated so as to connect the balance circuit 5 to the reference input terminal of the operational amplifier 7 in response to the high level output of the detector 11 in a step P23 and at the same time the switch 23 is opened. The process of the step 22 corresponds to the case that the calling station is located at the near end and the current flowing through the telephone line L1, L2 is large, while the process in the step 23 corresponds to the case where the calling station is located at the far end and the current in the telephone line L1, L2 is small. In the former case, the balance circuit 4 for the near end connection is selected and at the same time the attenuation of the input audio signal is increased by inserting the resistance R8 in the signal path of the incoming audio signal to the non-inverting input terminal of the operational amplifier 7. In the latter case, on the other hand, the balance circuit 5 for the far end connection is selected and at the same time the resistance R8 is bypassed. Thereby, the amplification factor of the amplification circuit 2 is increased.

In this way, the side tone correction circuit of the present embodiment automatically controls the input impedance and the amplification factor of the reception side amplification circuit 2 in response to the current in the telephone line L1, L2. Thereby, not only the sound quality of the received audio signal but also the sound volume of the received audio signal is optimized.

Although the foregoing embodiment describes only the control of the amplification factor of the received audio signal, the present embodiment may be modified such that the amplification factor of the transmission side amplification circuit is adjusted such that the magnitude of the transmitted audio signal and the side tone is controlled.

Next, a fourth embodiment of the present invention will be described with reference to FIGS.8 and 9. In the drawings, the parts which are identical to the parts described in the preceding drawings are given identical reference numerals and the description thereof will be omitted.

Figure 8:
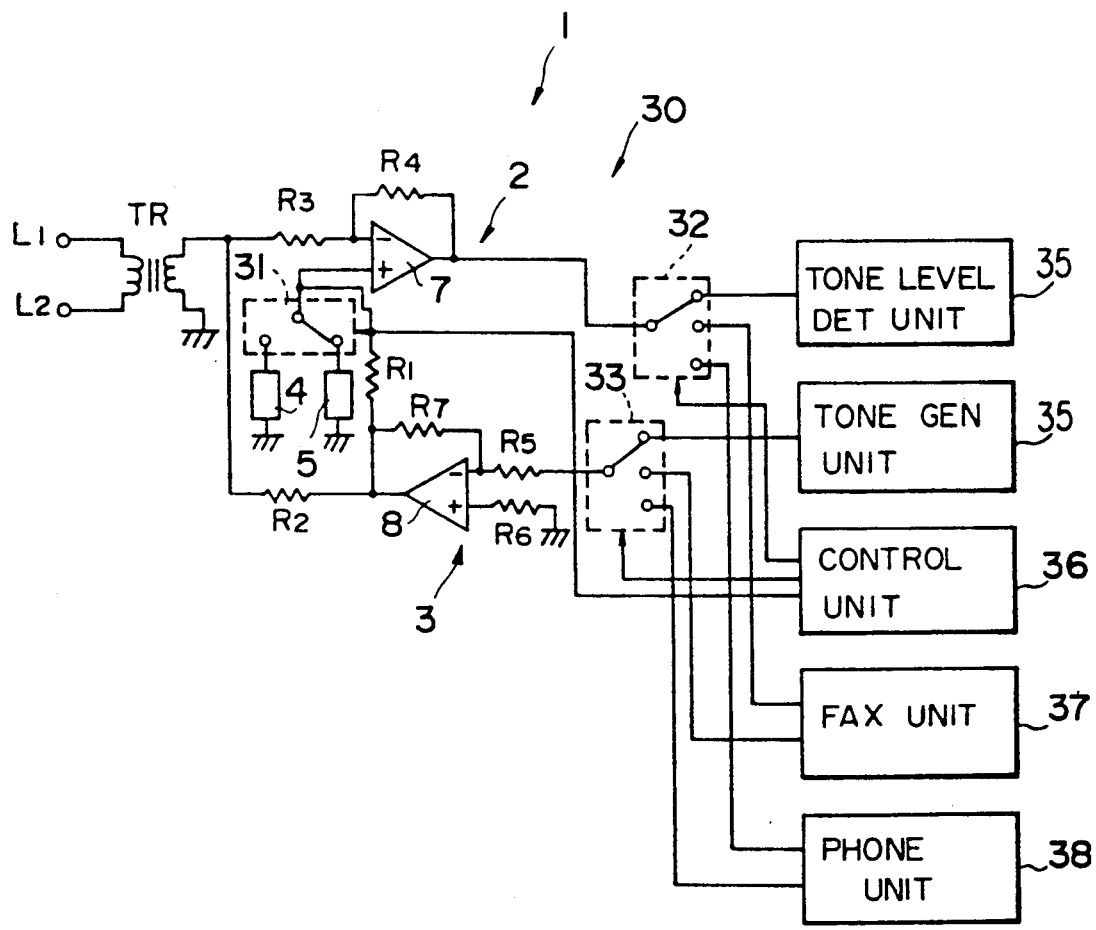
FIG.8 is a circuit diagram showing an overall construction of the side tone correction circuit according to a fourth embodiment of the present invention.

Referring to FIG.8 showing a side tone correction circuit 30 of the present embodiment, the circuit 30 includes the balance circuits 4 and 5, switches 31, 32 and 33, a tone level detection unit 34 and a tone generating unit 35, wherein the switch 31 is controlled by a control unit 36 so that the balance circuits 4 and 5 are connected selectively to the reference input terminal of the operational amplifier 7. Further, the switches 32 and 33 are controlled by the control unit 36 such that the output terminal of the operational amplifier 7 forming the reception side amplification circuit 2 is connected to the tone level detection unit 34 by the switch 32 when the side tone level and frequency are being detected and such that the output of the tone generating unit 35 is connected to the input terminal of the operational amplifier 8 forming the transmission side amplifying circuit 3 by the switch 33. The tone generating unit 35 produces a plurality of tone signals as will be described leter. Further, the switch 32 is controlled such that a facsimile unit 37 or a telephone unit 38 is selectively connected to the reception side amplification circuit 2 for the usual facsimile or telephone transmission and reception. Similarly, the switch 33 is controlled such that the transmission side amplification circuit 3 is connected selectively to either the facsimile unit 37 or the telephone unit 38.

The control unit 36 includes a central processing unit (CPU), read-only memories (ROM) and random access memories (RAM) wherein the CPU controls the operation of the side tone correction circuit 30, the tone level detection unit 34 and the tone generating unit 35 in accordance with a program stored in the ROM such that the side tone level detection to be described later is carried out. Further, the CPU controls the facsimile unit 37 and the telephone unit 38 for performing the ordinary facsimile transmission and reception as well as the telephone communication.

As usual, the facsimile unit 37 is equipped with a modem, a plotter, a scanner and other necessary units and transmits an image information formed by scanning a document wit the scanner via the two-wire/four-wire conversion circuit 1 after modulation by the modem. When image information is received, the received image information is demodulated by the modem and is recorded on a recording sheet by the plotter. The telephone unit 38 is an apparatus of the usual type equipped with a communication circuit and a hand set and it establishes a connection to the network via the two-wire/four-wire conversion circuit. Thereby, the telephone communication is achieved as usual.

Next, the operation of the side tone correction circuit 30 will be described. The significant feature of this embodiment is that the selection of the balance circuit is made on the basis of the detection of the side tone level in the reception side amplification circuit 2, which is made under control of the control unit, such that the balance circuit 4 and the balance circuit 5 are alternately selected and the side tone level detected by use of the tone level detection unit 34 and the tone generating unit 35 for each selection of the balance circuit 4 and the balance circuit 5.

Figure 9A:
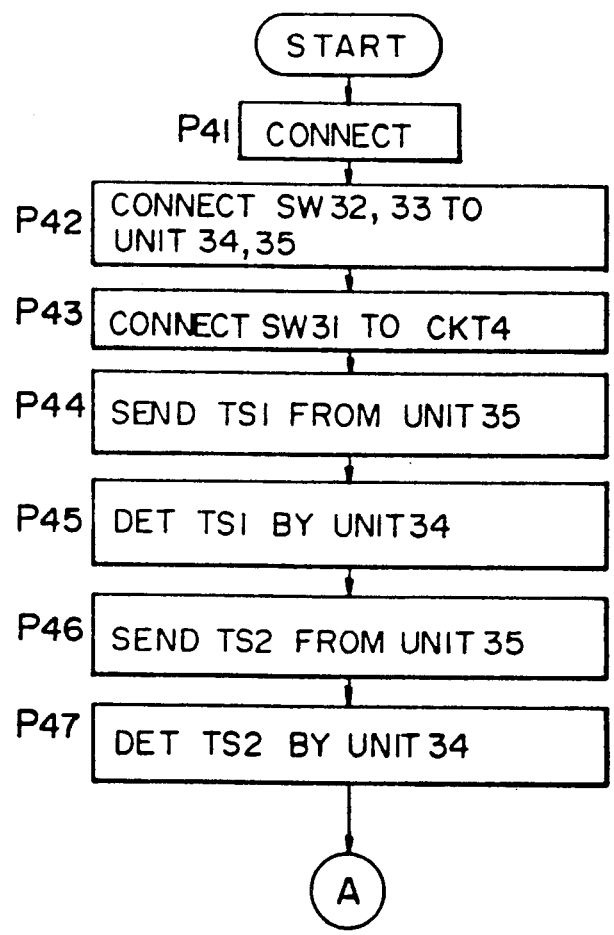
FIGS.9A and 9B are flowcharts showing the process of side tone level detection performed in the side tone correction circuit of FIG.8.
Figure 9B:
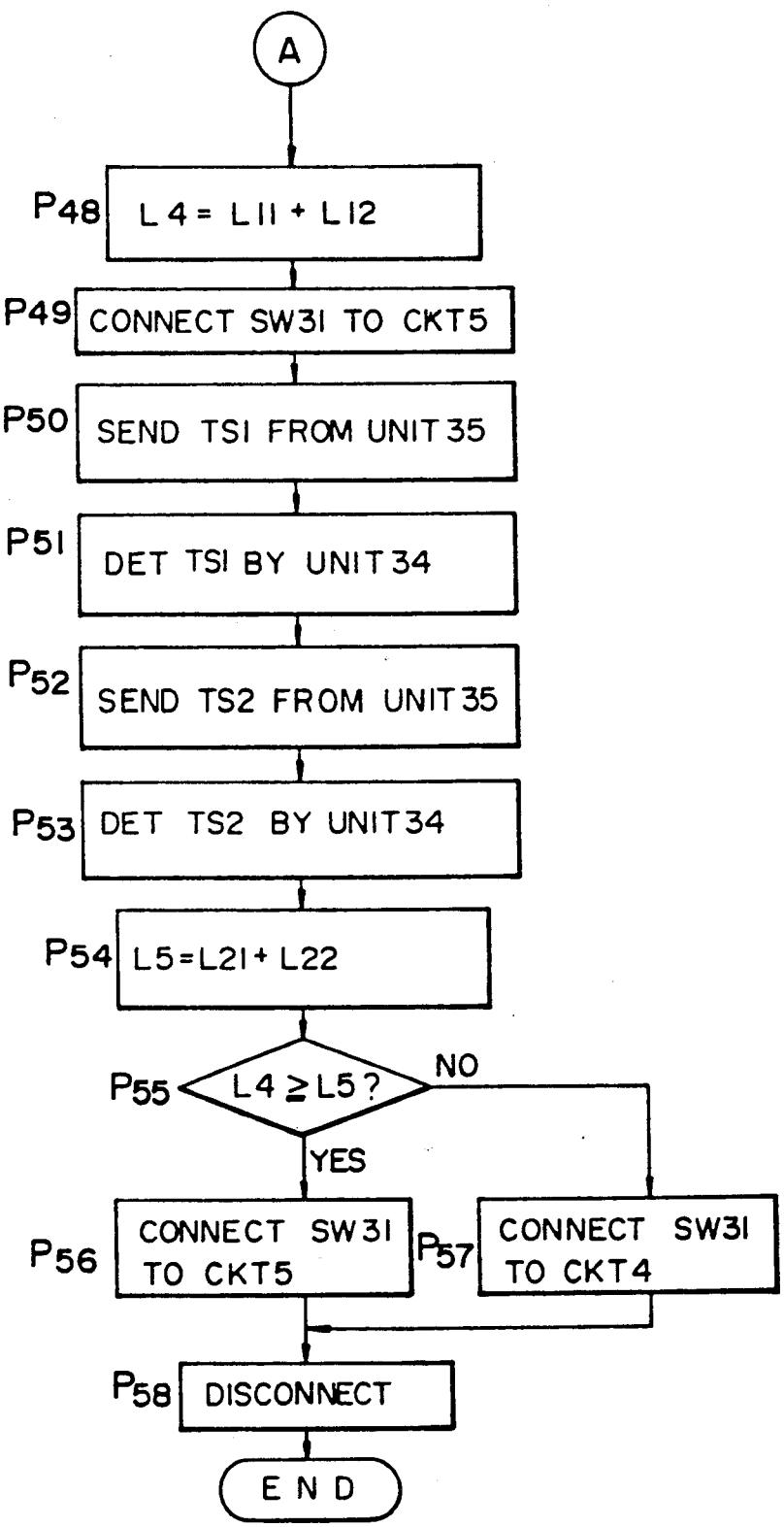

FIGS.9A and 9B show a flowchart of the foregoing operation. Referring to the drawings, when there is an incoming call, the operator picks up the hand set of the telephone unit 38 and presses a predetermined function key, irrespective of whether a call is being received or sent to a predetermined side tone level detection process. In response to this, the control unit 36 connects the telephone line L1, L2 to a telephone network not illustrated in the drawing in a step P41, and controls the switches 32 and 33 in a following step P42 such that the tone level detection unit 34 is connected to the output terminal of the operational amplifier 7 and the tone generating unit 35 is connected to the input terminal of the operational amplifier 8. In a next step P43, the switch 31 is controlled such that the balance circuit 4 is connected to the reference input terminal of the operational amplifier 7 and a predetermined first tone signal TS1 having a first frequency is generated by the tone generating unit 35 in a step P44. Further, in a step P45, a level detection is made by the tone level detection unit 34 for detecting a level L11 which is the level of the tone signal TS1 in the reception side amplification circuit 2 in the case in which the balance circuit 4 is selected.

Next, in a step P46, a second tone signal TS2 having a frequency which is different from that of the tone signal TS1 is generated by the tone generating unit 35 and a level L12 which is the level of the tone signal TS2 in the circuit 2 is again detected by the unit 34 in a step P47. Further, in a step P48, a side tone level L4 is calculated according to the following equation (1)

$$L4 = L11 + L12 \tag{1}$$

Further, in a following step P49, the switch 31 is controlled such that the balance circuit 5 is connected to the amplifier 7 instead of the balance circuit 4, and the foregoing tone signal TS1 is generated subsequently by the tone generating unit TS1 in a step P50 and the level L21 is detected again in a following step P51 by the unit 34 in the case where the balance circuit 5 is selected. Next, in a step P52, the tone generating unit 35 produces the second tone signal TS2 in a step P52 and the detection of the level L22 is made in a step P53. Further, a side tone level L5 in the case where the balance circuit 4 is seleveted is calculated in a step P54 according to the following equation (2) defined as $$L5 = L21 + L22 \tag{2}$$

Next, a discrimination is made in a step P55 for discriminating whether the side tone level L4 is equal to or larger than the side tone level L5 or not. In the case where it is discriminated that the level L4 is equal to or larger than the level L5, the switch 31 is controlled in a step P56 such that the balance circuit 5 is connected to the reference input terminal of the operational amplifier 7, while when it is discriminated that the level L5 is less than the level L5, the switch 31 is controlled in a step P57 such that the balance circuit 4 is connected to the reference input terminal of the operational amplifier 7. Finally, in a step P58, the telephone line L1, L2 is disconnected and the process is ended.

As a result of the foregoing operation, the amplification factor of the reception side amplification circuit 2 is increased when it is discriminated that L4 is equal to or larger than L5, indicating that the connection is made with the station at the far end, by selecting the balance circuit 5 which decreases the input resistance at the inverting input terminal of the operational amplifier 7. On the other hand, the amplification factor of the circuit 2 is decreased when it is discriminated that L4 is less than L5, indicating that the connection is made with the station at the near end, by selecting the balance circuit 4, which increases the input resistance at the inverting input terminal of the operational amplifier 7. In this way, the present embodiment actually detects the side tone level in the case where the balance circuit 4 is connected and in the case where the balance circuit 5 is connected, and the side tone level is optimized by selecting one of the balance circuits 4 and 5 on the basis of the foregoing detection. As a result, optimization is achieved not only with respect to the sound quality of the received audio signal but also with respect to the sound volume. Further, it is no longer necessary to use the current detector 11 so it is eliminated from the present embodiment, and thus the side tone correction circuit can be constructed at a less expensive cost.

It should be noted that the tone signal generated by the tone generation unit 35 is not limited to TS1 and TS2, but that instead a number of tone signals each having a distinct frequency may be generated. Thereby, the accuracy of the detection of the impedance change is improved. Further, the calculation of the side tone level is not limited to the foregoing simple summation process shown in the equations (1) and (2) but may instead be a weighted summation process using the weights corresponding to the actual frequency characteristic of hearing.

Figure 10:
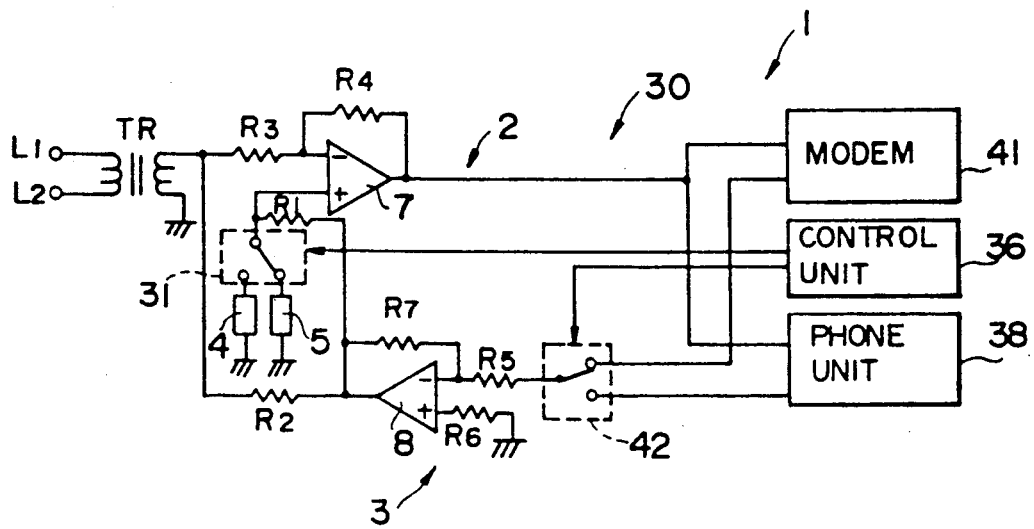
FIG.10 is a circuit diagram showing a modification of the side tone correction circuit of FIG.8.

As a modification of the foregoing fourth embodiment, one may provide a side tone correction circuit shown in FIG.10 wherein the tone level detection unit 34 and the tone generating unit 35 are incorporated in a modem 41. Thereby, the switches 32 and 33 in the embodiment of FIG.8 are reduced into a single switch 42 and thus the circuit construction of the side tone correction circuit 30 is simplified. When the modem 41 is of the type which does not have the tone level detection function, the tone detection unit 34 has to be used separately.

Figure 11:
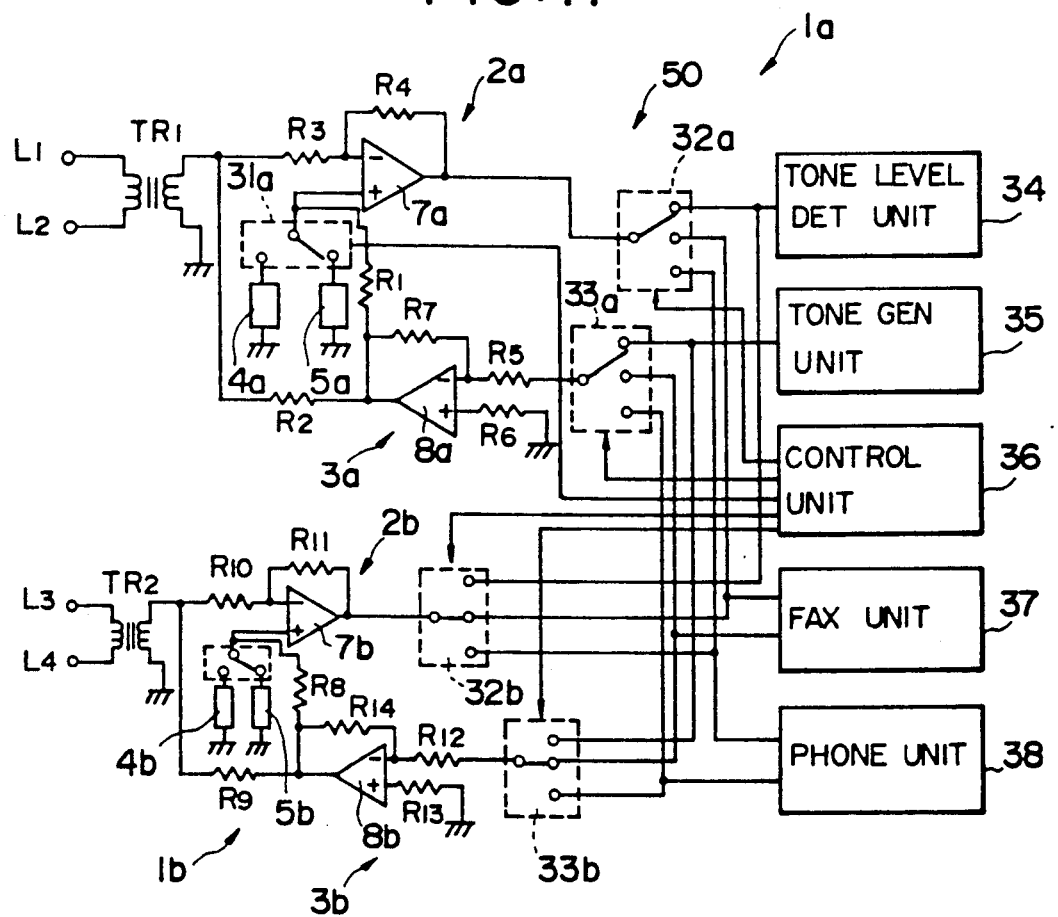
FIG.11 is a circuit diagram showing a further modification of the circuit of FIG.10

FIG.11 shows a fifth embodiment of the present invention having two two-wire/four-wire conversion circuits in which the connection can be established via a line L5, L6 in addition to the line L1, L2. In FIG.11, the parts which are identical with those in FIGS.8 and 10 are given identical reference numerals and the description will be omitted.

Referring to FIG.11, the side tone correction circuit designated by a numeral 50 includes first and second two-wire/four-wire conversion circuits 1a and 1b wherein the conversion circuit 1a includes a first reception side amplification circuit 2a and a first transmission side amplification circuit 3a and the conversion circuit 1b includes a second reception side amplification circuit 2b and a second transmission side amplification circuit 3b. The amplification circuits 2a, 2b, 3a and 3b respectively include operational amplifiers 7a, 7b, 8a and 8b as well as cooperating resistances R1–R14, as illustrated in FIG.11, wherein each of the amplification circuits 2a and 2b has a construction substantially identical to the amplification circuit 2 and each of the amplification circuits 3a and 3b has a construction substantially identical to the amplification circuit 3. Thus, the first reception side amplification circuit 2a and the first transmission amplification circuit 3a are connected to the line L1, L2 via a first transformer TR1, while second reception side amplification circuit 2b and the second transmission side amplification circuit 3b are connected to the line L3, L4 via a second transformer TR2. The side tone correction circuit 50 includes, in addition to the tone level detection unit 34 and the tone generating unit 35, a pair of balance circuits 4a and 5a corresponding to the balance circuits 4 and 5 and cooperating with the amplifier 7a, another pair of balance circuits 4b and 5b also corresponding to the balance circuits 4 and 5 and cooperating with the amplifier 8a, a switch 31a corresponding to the switch 31 for selectively connecting the balance circuits 4a and 5a to the amplifier 7a, a switch 31b also corresponding to the switch 31 for selectively connecting the balance circuits 4b and 5b to the amplifier 7b, a switch 32a corresponding to the switch 32 for connecting the tone level detection unit 34 to the amplifier 7a, a switch 32b also corresponding to the switch 32 for connecting the tone level detection unit 34 to the amplifier 7b, a switch 33a corresponding to the switch 33 for connecting the tone generating unit 35 to the amplifier 8a, and a switch 33b also corresponding to the switch 33 for connecting the tone generating unit 35 to the amplifier 8b.

FIG.11 shows the circuit 50 in a state where the side tone level detection is performed for the line L1, L2. In this state, the facsimile unit 37 produces no output. As it is possible in the present invention to eliminate the tone from the line L3, L4 by controlling the facsimile unit 37, the filtering process, which would otherwise be required in the unit 34 for selectively passing only the tone signal generated by the unit 35 and eliminating the tone signal sent from the exchange station, can be eliminated and thus the circuit construction becomes simple. Further, the accuracy of the side tone correction is improved.

Further, the present invention is not limited to these embodiments described heretofore but various variations and modifications may be made without departing from the scope of the invention.

What is claimed is:

1. A conversion circuit for connecting a two-wire circuit and a four-wire circuit to each other, comprising:

a transformer having a primary side and a secondary side, said primary side being connected to a two-wire circuit having a variable impedance;

first amplifying means having a first input terminal connected to the secondary side of the transformer for receiving an audio frequency signal from the two-wire circuit and a second input terminal, said first amplifying means having an output terminal connected to a reception-side line of the four-wire circuit;

second amplifying means having an input terminal connected to a transmission-side line of the four-wire circuit and an output terminal connected to the secondary side of the transformer for sending out an audio signal on the transmission-side line to the two-wire circuit;

a plurality of impedance matching circuits having respective impedances each determined so as to simulate one state of the variable impedance of the two-wire circuit; and switching means for selectively connecting one of the plurality of impedance matching circuits to the second input terminal of the first amplifying means.

2. A conversion circuit as claimed in claim 1 in which said first amplifying means comprises an operational amplifier having an inverting input terminal as the first input terminal and a non-inverting input terminal as the second input terminal.

3. A conversion circuit as claimed in claim 1 further comprising a current detection means connected in series to the two-wire circuit for detecting the electric current flowing therethrough, said current detection means producing an output indicative of the detected current, wherein said switching means is connected so as to be supplied with the output of the current detection means, said switching means being activated such that one of the impedance matching circuits is connected selectively to the second input terminal in response to the output of the current detection means.

4. A conversion circuit as claimed in claim 3 further comprising variable attenuation means interposed between the secondary side of the transformer and the first input terminal of the first amplifying means for attenuating the audio frequency signal supplied to the first input terminal with a variable attenuation constant, said variable attenuation means being connected to the current detection means so as to be supplied with the output of the current detection means, wherein said variable attenuation constant is changed in response to the output of the current detection means.

5. A conversion circuit as claimed in claim 1 further comprising a tone generation means for generating a test tone, second switching means for selectively connecting either the tone generation means or the transmission-side line of the four-wire circuit to the input terminal of the second amplifying means, tone level detection means supplied with an output of the first amplifying means for detecting the level of the output of the first amplifying means, third switching means for selectively connecting the output terminal of the first amplifying means either to the reception-side line of the four-wire circuit or to the tone level detection means, and control means for controlling said first through third switching means, said control means controlling the first through third switching means such that the plurality of impedance matching circuits are sequentially connected to the second input terminal of the first amplifier by the first switching means, the tone level detection means is connected to the output of the first amplifying means and the tone generating means is connected to the input terminal of the second amplifying means, said control means thereby performing the detection of the level of the test tone by the tone level detection means, said control means further controlling, on the basis of the detection of the level of the test tone, the first switching means such that one of the impedance matching circuits which minimizes the detected level of the test tone is connected to the second input terminal of the first amplifying means, said controlling means further controlling the second and third switching means such that the output of the first amplifying means is connected to the reception-side line of the four-wire circuit and such that the transmission-side line of the four-wire circuit is connected to the input terminal of the second amplifying means.

* * * * *